No. 720,725. PATENTED FEB. 17, 1903.
A. MOFFITT.
PORTABLE SHIPPING STALL FOR HORSES, &c.
APPLICATION FILED MAY 14, 1902.
NO MODEL. 2 SHEETS—SHEET 1.

Witnesses
Elmer Leavey
James R. Mansfield

Inventor
Alexander Moffitt
By Alexander & Dowell
Attorneys

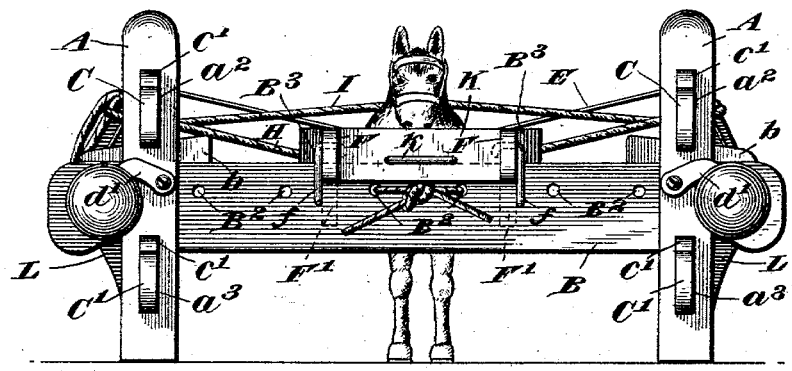
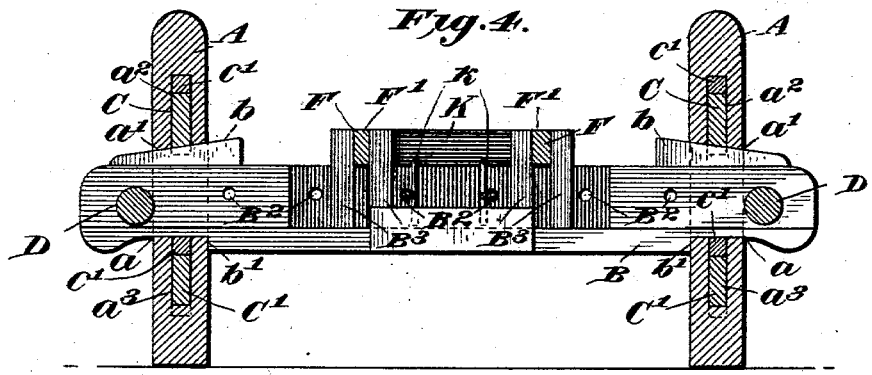
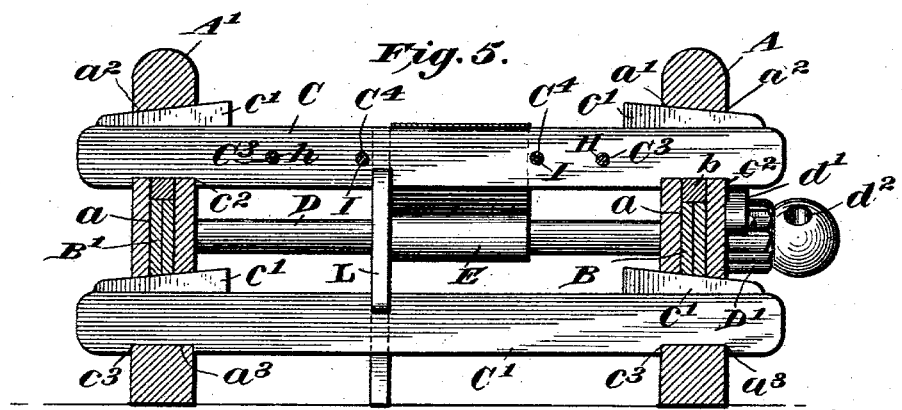

UNITED STATES PATENT OFFICE.

ALEXANDER MOFFITT, OF ELKINS, WEST VIRGINIA.

PORTABLE SHIPPING-STALL FOR HORSES, &c.

SPECIFICATION forming part of Letters Patent No. 720,725, dated February 17, 1903.

Application filed May 14, 1902. Serial No. 107,317. (No model.)

*To all whom it may concern:*

Be it known that I, ALEXANDER MOFFITT, of Elkins, in the county of Randolph and State of West Virginia, have invented certain new and useful Improvements in Portable Shipping-Stalls for Horses, &c.; and I hereby declare that the following is a full, clear, and exact description thereof, reference being had to the accompanying drawings, which form part of this specification.

This invention is an improvement in portable stocks or stalls for animals, particularly designed for transportation of horses and cattle on railroads and vessels; and its objects are to provide a portable (preferably knockdown) stall or nest of stalls which can be readily erected in an ordinary stock or box car or on shipboard on or between decks and when not in use can be knocked down and stowed into small space, enabling other freight to be shipped in place of the cattle on return trips of cars or vessels.

Another object is to construct such stall with means for suspending or supporting the animals by adjustable belly-bands, whereby they can be upheld in case of sudden jars or in rough or tossing movements of cars or vessels; also, to provide novel arrangements of rope fastenings to keep the animals in position without injuring or hurting them, while preventing their rearing or kicking out of their proper places in the stalls, yet permitting the desired freedom of the limbs, so that they will not be unduly harassed or restricted; also, to provide facilities for feeding and watering the stock *en route*.

The invention therefore consists in the novel construction and combination of parts hereinafter claimed, and the accompanying drawings illustrate a knockdown stall capable of accommodating three animals, but not drawn to scale in order to enable the joints and connections of parts to be more readily seen and understood.

Figure 1:
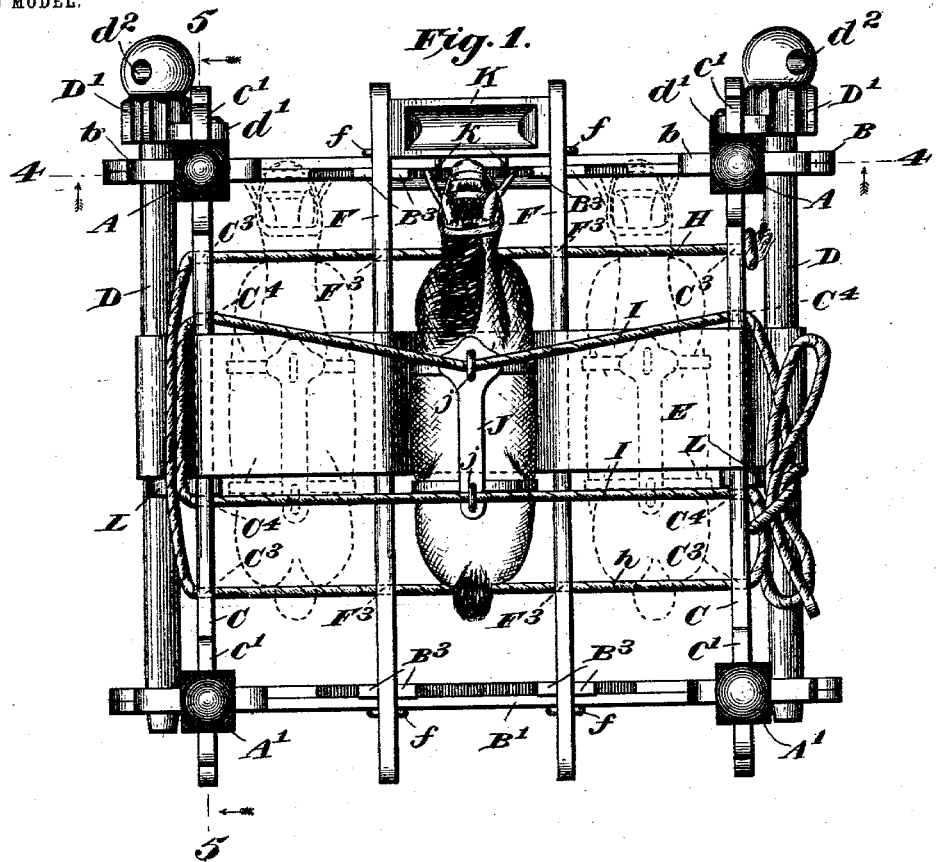
Figure 2:
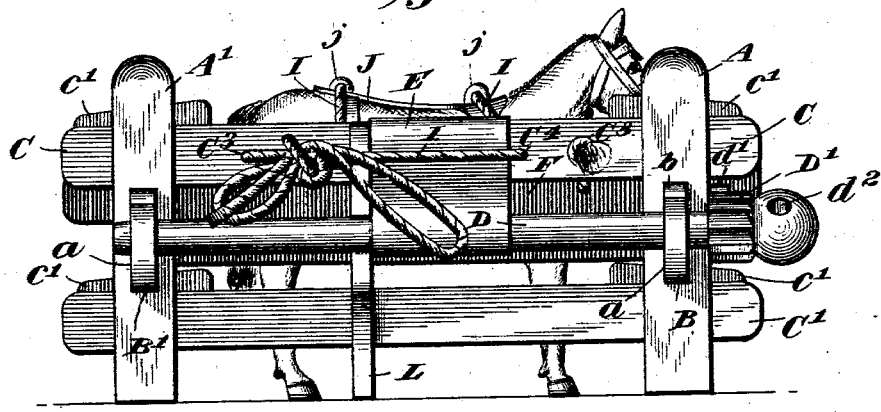

Figure 1 is a top plan view of a complete stall, indicating three animals in position therein. Fig. 2 is a side elevation; Fig. 3, an end view; Fig. 4, a transverse section on line 4 4, Fig. 1; Fig. 5, a longitudinal section on line 5 5, Fig. 1.

The stall is composed of four uprights, one at each corner thereof. The opposite uprights A A at the front of the frame are connected by a front bar B, the ends of which project through mortises or slots $a$ in the uprights, the tops of the slots being preferably beveled, as shown at $a'$, and the engaging portions of the bar B are notched, as at $b'$, to fit the bottoms of the mortises, and after the ends of bar B are passed through the slots in the upright wedges $b$ are driven therein above the bars and fasten the latter securely in place, making a "knockdown" but rigid front frame. The two rear uprights A' are provided with similar slots $a$ and are connected by a rear bar B', similar to the front bar B, and detachably secured in the slots of the posts A' by wedges, as shown. Above and below the slots $a$ in uprights A A' are transversely-disposed slots $a^2\ a^3$, with which are engaged upper and lower side bars C C', the tops of the slots $a^2$ being beveled and the side bars having notches $c^2\ c^3$ in their lower edges, respectively, to engage the bottoms of the slots $a^2\ a^3$ and being secured when inserted therein by wedges, as shown in the drawings.

The ends of bars B B' project beyond the uprights and are provided with holes in which are journaled roller bars or shafts D D, to which are attached the opposite ends of a wide suspending belt or belly-band E, that extends across the stall from one side to the other, said band passing over the upper side bars C, as shown. The shafts D are provided with ratchets D', engaged by pawls $d'$, attached to the adjacent upright, thus providing a means of securing the band E when tensioned. The shafts D can be rotated by inserting a suitable lever or tool in holes $d^2$ in the front ends of the shaft or by other convenient means.

Where but one stall is to be used, it would be formed by the uprights A A', front and rear bars B B', and side bars C C'; but it is preferable to make the stalls wide enough to accommodate more than one animal, and, as shown, it is large enough for three animals placed side by side. In order to separate the animals, however, and practically confine each in a separate box-stall, longitudinal division-bars F F are used. These bars extend longitudinally of the stall, parallel with bars C C', and are supported upon the front and rear bars B B', which latter are provided with guides B³, between which the ends of bars F F are engaged and held down by hooks $ff$ or other convenient fastenings. Bars F, moreover, are shouldered, as at F', (see Figs. 3 and 4,) so that they cannot play longitudinally between bars B B'. The band E passes over both bars F F, as shown.

The side bars C C' and bars F F are perforated at C³ and F³, respectively, for the passage of ropes H $h$, which are led across the stalls both in front of and behind the animals, as shown, to prevent them lurching too far forward or backward in the stalls or jumping or kicking out of position. The bars C C' are, moreover, perforated at C⁴ for the passage of holding-down ropes I, which are led over the backs of the animals and assist in keeping them in place. Where tender-skinned or fine animals are being transported, it is desirable to provide them with a harness J, having back-loops $jj$, through which ropes I I can be passed, this harness assisting in keeping the ropes in place and preventing them cutting or abrading the animals.

The front bar B is provided with openings B², in which to fasten the halters.

Removable troughs or boxes K, provided with supporting-hooks $k$, adapted to catch over the front bar B, can be hung on said bar between the adjacent bars F F or between bars F and adjacent uprights, affording a convenient means for watering and feeding the stock.

Pieces L L may be placed between the side bars C C', adjacent to the band E, as shown, to brace the shafts D D and prevent sagging thereof.

Operation: The stalls, as shown in Fig. 1, are of such size that they can be readily placed within an ordinary stock or box car, so that the animals will stand transversely thereof, leaving room for an attendant to pass between the horses and side of car. An ordinary stock-car will accommodate four such stalls readily, and thus transport twelve animals in one car. In erecting the stalls the sides and front uprights are put in place and band E slackened down upon the floor, ropes H, $h$, and I being removed out of the way. The animals are then led into place and fastened by their halters to bar B. Bar B' is then put in place and fastened. Then bars F F are put in place, being slipped under the band E and between adjacent animals, so as to separate them. After the bars are securely positioned the band E should be tightened sufficiently to partially support the animals. If weak or sickly animals are being transported, the band may be tightened sufficiently to entirely suspend them. Then ropes H, $h$, and I are put in place and secured so as to keep the animals in their proper relative positions. By this arrangement the horses or animals are comfortably but securely supported. The band E prevents their falling if the car is suddenly jarred or jerked or the vessel rolls or lurches and enables them to rest comfortably, as in hammocks or slings, while the restraining ropes and bars prevent the animals plunging, kicking, or jumping. High-bred horses and cattle unaccustomed to transportation are very nervous, and it is advisable to suspend them until they become used to the motion, when the band E can be relaxed to permit them to stand on their feet. The stall can also be usefully employed in breaking horses unaccustomed to harness or saddle, as they can be placed therein, confined, and suspended until they submit to directions. The stalls can also be usefully employed in shoeing high-strung or vicious horses and for various veterinary purposes. Therefore while principally designed for transportation purposes I do not restrict myself to any particular use thereof.

Where but one horse is to be shipped in a three-compartment stall, he is placed in the central stall, and the band E can be led over bars F directly to rollers D without passing over the side bars C. In shipping two horses they should be placed in separate stalls and the band passed under their bellies, over the intermediate bar or bars F, over the outside bars C, and down to the rollers. In shipping three horses the arrangement shown in Fig. 1 should be followed. If desired, the band E could be passed through harness-loops under the bellies of the horses to prevent the band slipping too far back under the animals.

The knockdown construction of the stalls enables them to be packed into small compass and shipped as simple freight to the point from whence animals are to be shipped, or returned as simple freight from the point where the animals are delivered, materially lessening the customary expenses of shipping animals in specially-designed stock-cars.

Having thus described my invention, what I therefore claim as new, and desire to secure by Letters Patent thereon, is—

1. A knockdown stall for animals, comprising four upright posts provided with slots, and front, rear and side bars detachably secured to said posts, by passing through the slots therein, and notched to prevent longitudinal movement in the slots, and means for confining the bars in the slots; with the supporting belly-band extending across the stall and the rotatable shafts journaled on the sides of the stall for adjusting said band, substantially as described.

2. A knockdown stall for animals, comprising four uprights provided with slots, front, rear and side bars detachably engaging the slots in said uprights, and means for confining the bars in the slots; with the rotatable shafts journaled in the projecting ends of the front and rear bars at the sides of the stall, and a band extending across the stall and attached to the shafts, substantially as described.

3. A three-compartment stall, comprising a rectangular frame, two longitudinally-disposed bars detachably secured to the front and rear of frame parallel with the sides thereof, the belly-band extending across said bars from one side of frame to the other, means on the sides of the frame for adjusting said band, and ropes extending transversely across the several compartments and through openings in the said bars, substantially as described.

4. A stall, comprising a knockdown rectangular frame composed of four slotted upright posts, and front, rear and side bars having their ends detachably fastened in the slots of the uprights, two longitudinally-disposed bars detachably secured to the front and rear bars of the frame parallel with the sides thereof and dividing it into a plurality of compartments, the belly-band extending across said compartments from one side of frame to the other, rotatable shafts on the sides of frame for adjusting said band, and ropes extending transversely across said compartments and through openings in the said side and longitudinal bars, all substantially as described.

5. The herein-described stall, comprising four uprights, front and rear bars having their ends projecting through the uprights, side bars having their ends secured to the uprights; a shaft at the side of the stall journaled in the projecting ends of the front and rear bars, bars supported by and secured to the front and rear bars and lying parallel with the side bars; a belly-band extending across the stalls and attached to said shafts, and securing-ropes extending across the stall, all substantially as described.

6. The herein-described knockdown stall, comprising four slotted uprights, front and rear bars having their ends projecting through slots in the uprights, and detachably fastened thereto, side bars having their ends secured in other slots in the uprights, rotatable shafts at the sides of the stall, and bars supported by and detachably secured to the front and rear bars and lying parallel with the side bars, substantially as described.

7. The herein-described knockdown stall, comprising four slotted uprights, front and rear bars having their ends projecting through slots in the uprights, and detachably fastened thereto, side bars having their ends secured in other slots in the uprights, rotatable shafts at the sides of the stall, and bars supported by and detachably secured to the front and rear bars and lying parallel with the side bars; the belly-band extending across the stalls and attached to said shafts, the front and rear ropes extending across the stall and passing through openings in the side and intermediate bars, and ropes fastened to the side bars adapted to extend across the backs of the animals, all substantially as and for the purpose described.

In testimony that I claim the foregoing as my own I affix my signature in presence of two witnesses.

ALEXANDER MOFFITT.

In presence of—
 PAUL BROWN,
 ADA M. DARDEN.